United States Patent
Obasih et al.

(10) Patent No.: US 8,906,532 B2
(45) Date of Patent: Dec. 9, 2014

(54) ELECTROCHEMICAL CELLS WITH IMPROVED HEAT COLLECTION AND TRANSFER SYSTEMS

(75) Inventors: Kem Obasih, Brookfield, WI (US); Robert J. Mack, Milwaukee, WI (US); Richard M. DeKeuster, Racine, WI (US)

(73) Assignee: Johnson Controls Technology LLC, Wilmington, DE (US)

( * ) Notice: Subject to any disclaimer, the term of this patent is extended or adjusted under 35 U.S.C. 154(b) by 127 days.

(21) Appl. No.: 13/485,353

(22) Filed: May 31, 2012

(65) Prior Publication Data

US 2012/0308869 A1  Dec. 6, 2012

Related U.S. Application Data

(60) Provisional application No. 61/493,268, filed on Jun. 3, 2011.

(51) Int. Cl.
*H01M 10/50* (2006.01)
*H01M 2/00* (2006.01)
*H01M 6/46* (2006.01)
*H01M 2/26* (2006.01)

(52) U.S. Cl.
USPC ............ 429/120; 429/152; 429/161; 429/148

(58) Field of Classification Search
None
See application file for complete search history.

(56) References Cited

U.S. PATENT DOCUMENTS

| 5,278,002 | A | 1/1994 | Hiers | |
|---|---|---|---|---|
| 5,585,204 | A * | 12/1996 | Oshida et al. | 429/62 |
| 2004/0250993 | A1 * | 12/2004 | Ji-Hai et al. | 165/80.3 |
| 2010/0196745 | A1 | 8/2010 | Ahn et al. | |
| 2011/0269008 | A1 | 11/2011 | Houchin-Miller | |
| 2011/0300428 | A1 * | 12/2011 | Sohn | 429/120 |
| 2012/0009455 | A1 * | 1/2012 | Yoon | 429/120 |
| 2012/0148889 | A1 | 6/2012 | Fuhr | |

FOREIGN PATENT DOCUMENTS

| EP | 2079126 A1 | 7/2009 |
|---|---|---|
| FR | 2454187 A1 | 11/1980 |
| GB | 690408 | 4/1953 |

OTHER PUBLICATIONS

Partial International Search (Annex to form PCT/ISA/206) for PCT No. PCT/US2012/040381 dated Aug. 29, 2012; 2 pages.

* cited by examiner

*Primary Examiner* — Cynthia K. Walls
(74) *Attorney, Agent, or Firm* — Fletcher Yoder, P.C.

(57) ABSTRACT

Provided herein are electrochemical cells having improved heat collection and transfer systems. For example, one electrochemical cell includes a drawn can having a blind side and a second side opposite the blind side. The cell also includes a positive terminal disposed in the blind side of the can and electrically coupled to at least one positive electrode disposed within the can and a negative terminal disposed in the blind side of the can and electrically coupled to at least one negative electrode disposed within the can. The cell further includes a base coupled to a substantially flat edge disposed on the second side of the can. A bottom surface of the base is adapted to maintain a substantially flat configuration when coupled to a heat sink.

19 Claims, 9 Drawing Sheets

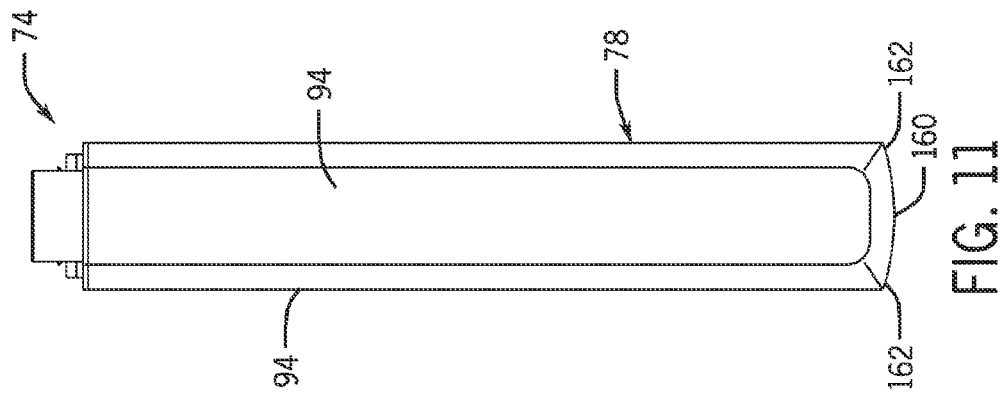
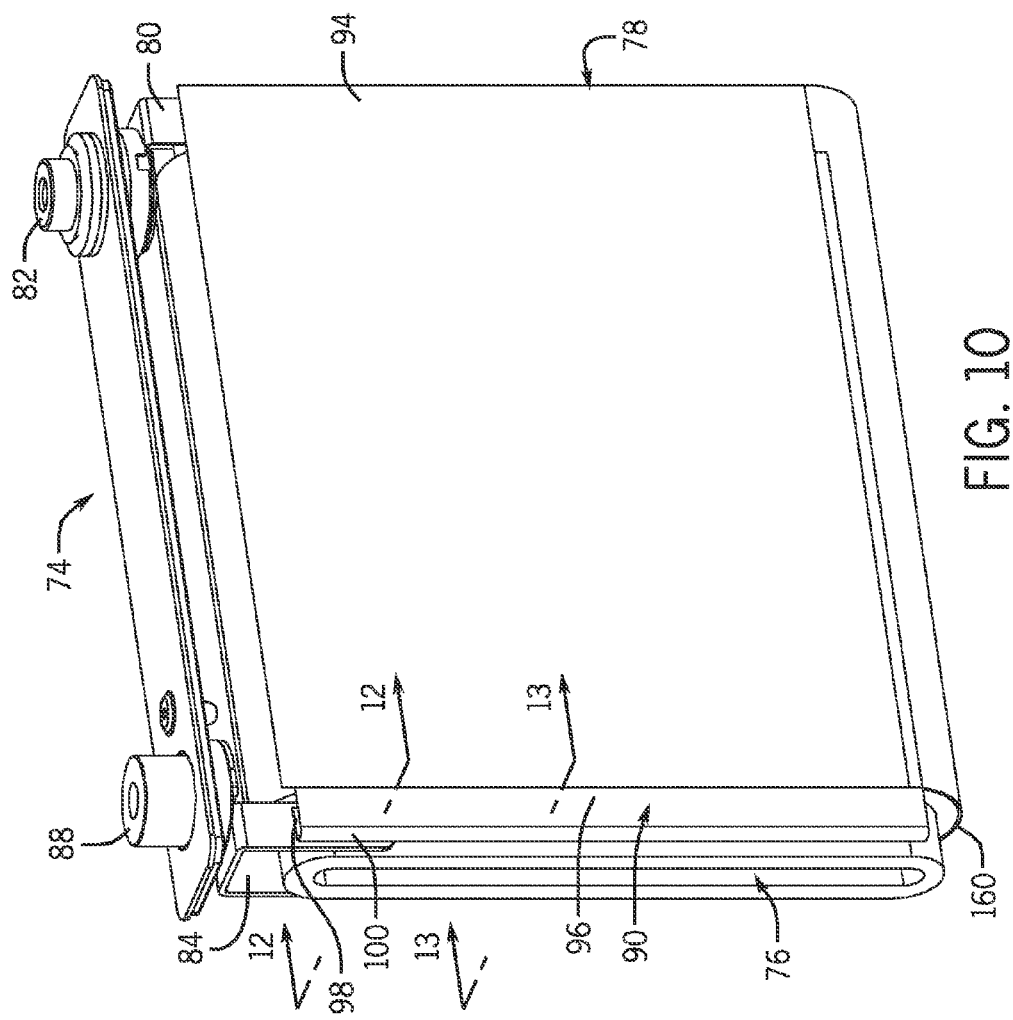

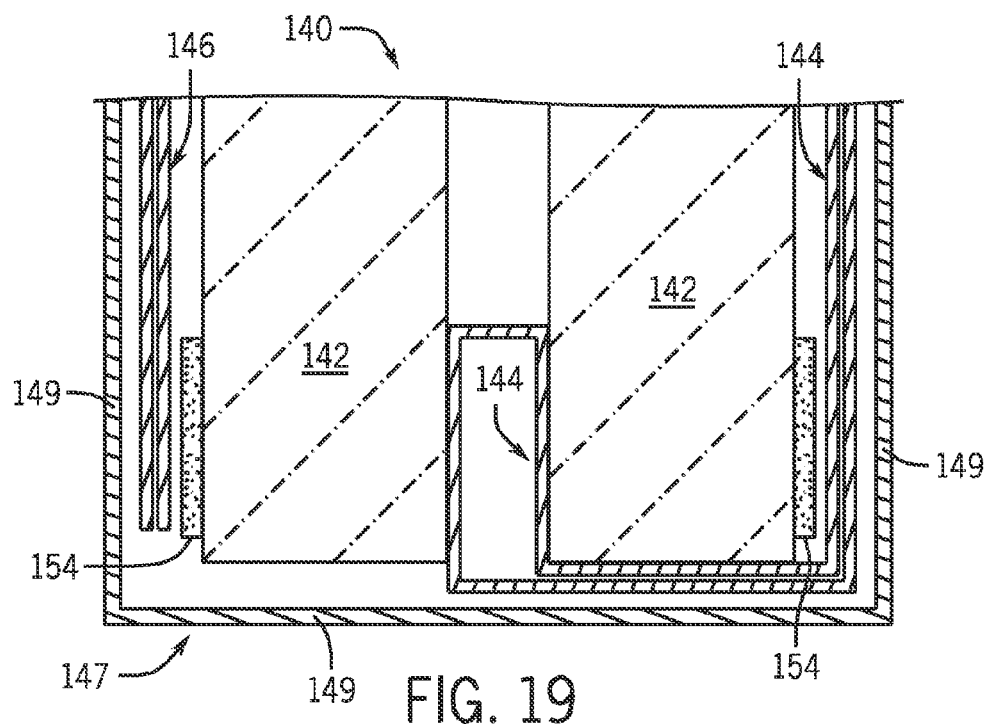
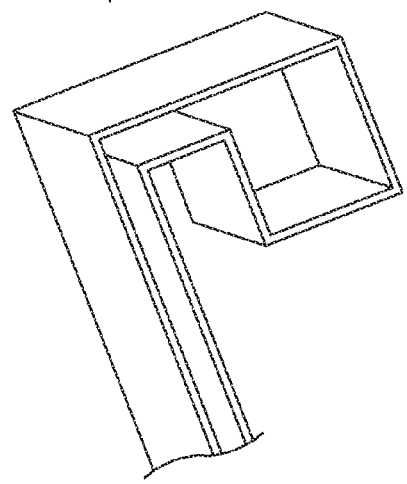
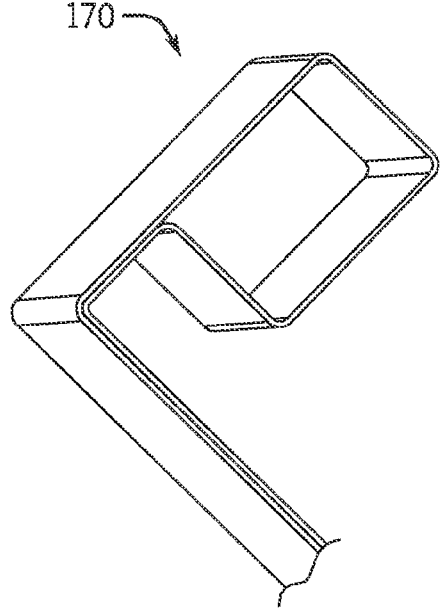

ELECTROCHEMICAL CELLS WITH IMPROVED HEAT COLLECTION AND TRANSFER SYSTEMS

CROSS REFERENCE TO RELATED APPLICATIONS

This application claims priority from and the benefit of U.S. Provisional Application Ser. No. 61/493,268, entitled, "Electrochemical Cell with Heat Collectors and Improved Base", filed Jun. 3, 2011, which is hereby incorporated by reference.

FIELD OF THE DISCLOSURE

The present application relates generally to the field of batteries and battery systems and, more specifically, to batteries and battery systems that have improved heat collection and transfer systems.

BACKGROUND

Vehicles using electric power for all or a portion of their motive power may provide a number of advantages as compared to more traditional gas-powered vehicles using internal combustion engines. For example, vehicles using electric power may produce fewer undesirable emission products and may exhibit greater fuel efficiency as compared to vehicles using internal combustion engines (and, in some cases, such vehicles may eliminate the use of gasoline entirely, such as in certain types of plug-in hybrid electric vehicles). As technology continues to evolve, there is a need to provide improved power sources, such as battery systems or modules, for such vehicles. For example, it is desirable to increase the distance that such vehicles may travel without the need to recharge the batteries. It is also desirable to improve the performance of such batteries and to reduce the cost associated with the battery systems.

The use of newer battery chemistries and the desire to enhance performance of electric vehicles have given rise to new design and engineering challenges. For example, due to the desire to closely monitor and/or regulate the operating temperature of, for example, lithium-ion cells, in order to improve operating cell efficiency, there is a continuing desire to improve the efficiency of heat transfer through the cell. Unfortunately, many current systems continue to experience inefficiencies as heat is transferred through the cells. For instance, many current cells rely on forced convection for regulation of cell temperature due in part to the irregular shaped surfaces of the formed components, which render heat conduction from the base of the cell inefficient. These same irregular shaped surfaces, such as between the base of the cell and the case of the cell, have limited the ability to truly hermetically seal the cell. Accordingly, it would be desirable to provide an improved system for use, for example, in vehicles using electric power, that addresses one or more of these challenges.

SUMMARY

In one embodiment, an electrochemical cell includes a drawn can having a blind side and a second side opposite the blind side. The cell also includes a positive terminal disposed in the blind side of the can and electrically coupled to at least one positive electrode disposed within the can and a negative terminal disposed in the blind side of the can and electrically coupled to at least one negative electrode disposed within the can. The cell further includes a base coupled to a substantially flat edge disposed on the second side of the can. A bottom surface of the base is adapted to maintain a substantially flat configuration when coupled to a heat sink.

In another embodiment, a battery system includes an electrochemical cell having a drawn can with a blind side and a second side opposite the blind side and having a substantially flat edge. The cell also includes a base coupled to the flat edge of the can and having a substantially flat bottom surface, wherein the bottom surface is adapted to remain substantially flat when the base is coupled to a heat sink. The cell further includes a terminal disposed in the blind side of the can and electrically coupled to at least one electrode disposed within the can and a current collector coupled to the electrode and to the terminal to electrically connect the electrode to the terminal. Additionally, a heat conductor is thermally coupled to the current collector and capable of dissipating heat away from the electrode and the current collector. An isolation member is disposed between the current collector and the can to separate but thermally couple the current collector and the can.

In another embodiment, a battery system includes an electrochemical cell having a housing with a casing having an opening disposed in a bottom portion of the casing opposite a blind side of the casing and a base disposed in the opening of the casing. A bottom surface of the base is substantially flat, and a terminal is disposed in the blind side of the casing and electrically coupled to at least one electrode disposed within the casing.

DRAWINGS

FIG. 10 is a partially exploded perspective view of an electrochemical cell having a heat conductor provided within the cell in accordance with a presently disclosed embodiment;

FIG. 11 is a side view of the electrochemical cell of FIG. 10;

FIG. 19 is a cross sectional view of the electrochemical cell of FIG. 17;

FIG. 20 is a perspective view of an embodiment of a heat conductor for use in an electrochemical cell; and FIG. 21 is a perspective view of another embodiment of a heat conductor for use in an electrochemical cell.

DETAILED DESCRIPTION

As described in more detail below, disclosed herein are embodiments of battery systems including electrochemical cells with improved heat collection and transfer systems. The foregoing battery systems may be configured for use in vehicles in which the battery system provides at least a portion of the propulsion power for the vehicle. It should be noted that in certain embodiments, the battery system may include one battery module or a plurality of battery modules and that each battery module may include one electrochemical cell or a plurality of electrochemical cells configured to store an electrical charge. In certain embodiments, the electrochemical cells may have an improved or reconfigured base as compared to traditional designs. The foregoing feature may offer advantages over traditional systems by providing for improved heat transfer and easier assembly while allowing for an improved hermetically sealed cell.

Figure 1:
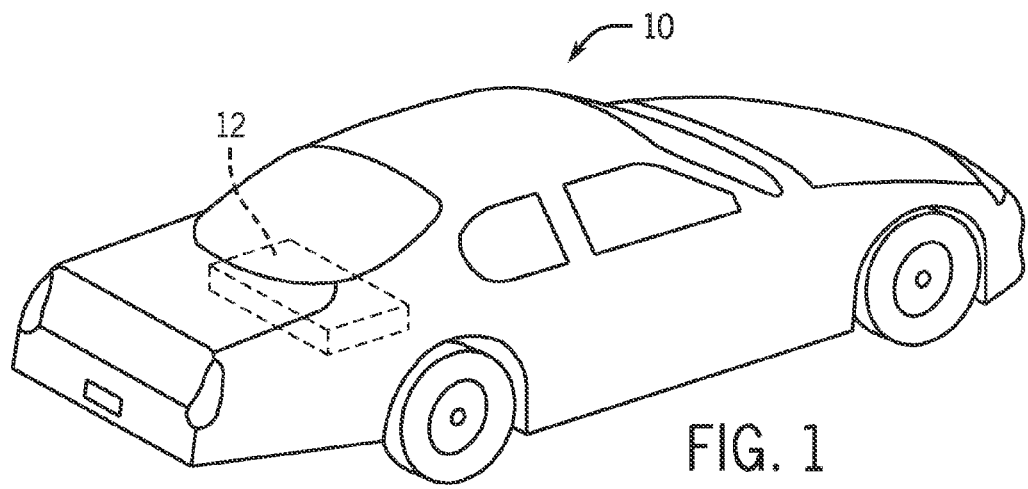
FIG. 1 is a perspective view of an embodiment of a vehicle having a battery system for providing all or a portion of the motive power for the vehicle.

Turning now to the drawings, FIG. 1 is a perspective view of a vehicle 10 in the form of an automobile (e.g., a car) having a battery system 12 for providing all or a portion of the motive power for the vehicle 10. For the purposes of the present disclosure, it should be noted that the battery modules and systems illustrated and described herein are particularly directed to applications in providing and/or storing energy in xEV electric vehicles. As will be appreciated by those skilled in the art, hybrid electric vehicles (HEVs) combine an internal combustion engine propulsion and high voltage battery power to create traction, and includes mild hybrid, medium hybrid, and full hybrid designs. A plug-in electric vehicle (PEV) is any vehicle that can be charged from an external source of electricity, such as wall sockets, and the energy stored in the rechargeable battery packs drives or contributes to drive the wheels. PEVs are a subcategory of vehicles using electric power for propulsion that include all-electric (EV) or battery electric vehicles (BEVs), plug-in hybrid vehicles (PHEVs), and electric vehicle conversions of hybrid electric vehicles and conventional internal combustion engine vehicles. The term "xEV" is defined herein to include all of the foregoing or any variations or combinations thereof that include electric power as a motive force. Additionally, although illustrated as a car in FIG. 1, the type of the vehicle 10 may be implementation-specific, and, accordingly, may differ in other embodiments, all of which are intended to fall within the scope of the present disclosure. For example, the vehicle 10 may be a truck, bus, industrial vehicle, motorcycle, recreational vehicle, boat, or any other type of vehicle that may benefit from the use of electric power for all or a portion of its propulsion power.

Further, although the battery system 12 is illustrated in FIG. 1 as being positioned in the trunk or rear of the vehicle 10, according to other exemplary embodiments, the location of the battery system 12 may differ. For example, the position of the battery system 12 may be selected based on the available space within the vehicle 10, the desired weight balance of the vehicle 10, the location of other components used with the battery system (e.g., battery management systems, vents or cooling devices, etc.), and a variety of other implementation-specific considerations.

Figure 2:
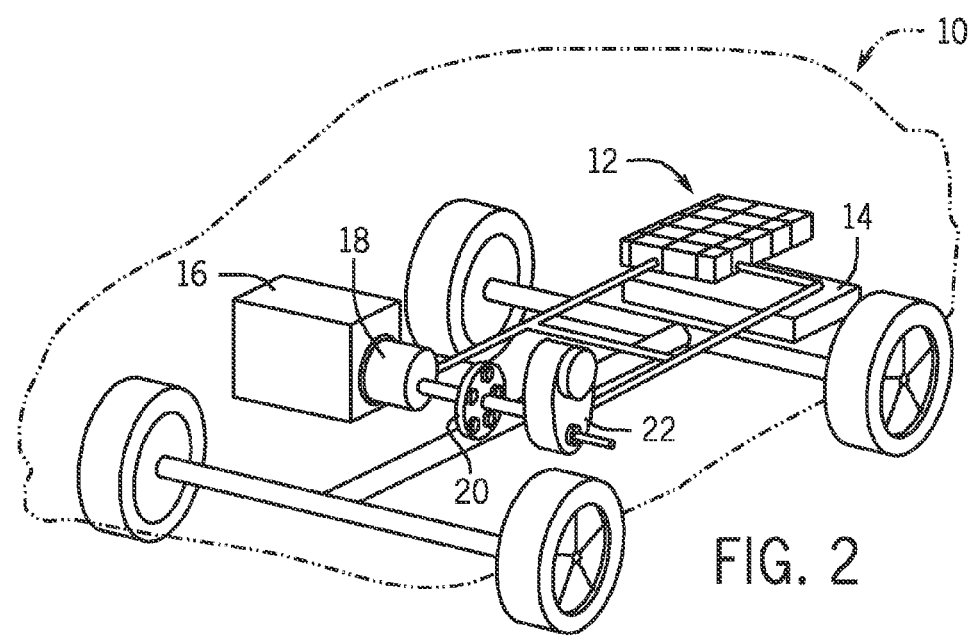
FIG. 2 illustrates a cutaway schematic view of an embodiment of the vehicle of FIG. 1 provided in the form of a hybrid electric vehicle.

FIG. 2 illustrates a cutaway schematic view of the vehicle 10 provided in the form of an HEV according to a presently disclosed embodiment. In the illustrated embodiment, the battery system 12 is provided toward the rear of the vehicle 10 proximate a fuel tank 14. However, in other embodiments, the battery system 12 may be provided immediately adjacent the fuel tank 14 or may be provided in a separate compartment in the rear of the vehicle 10 (e.g., a trunk) or may be provided elsewhere in the vehicle 10. An internal combustion engine 16 is provided for times when the HEV utilizes gasoline power to propel the vehicle 10. An electric motor 18, a power split device 20, and a generator 22 are also provided as part of the vehicle drive system. Such an HEV may be powered or driven by just the battery system 12, by just the engine 16, or by both the battery system 12 and the engine 16.

It should be noted that other types of vehicles and configurations for the vehicle electrical system may be used according to other embodiments, and that the schematic illustration of FIG. 2 should not be considered to limit the scope of the subject matter described in the present application. Indeed, according to various other embodiments, the size, shape, and location of the battery system 12, the type of vehicle 10, the type of vehicle technology (e.g., HEV, PEV, EV BEV, PHEV, xEV, etc.), and the battery chemistry, among other features, may differ from those shown or described.

According to an embodiment, the battery system 12 is responsible for packaging or containing electrochemical cells or batteries, connecting the electrochemical cells to each other and/or to other components of the vehicle electrical system, and regulating the electrochemical cells and other features of the battery system 12. For example, the battery system 12 may include features that are responsible for monitoring and controlling the electrical performance of the system, managing the thermal behavior of the system, containment and/or routing of effluent (e.g., gases that may be vented from a battery cell), and other aspects of the battery system, as described in more detail below.

Figure 3:
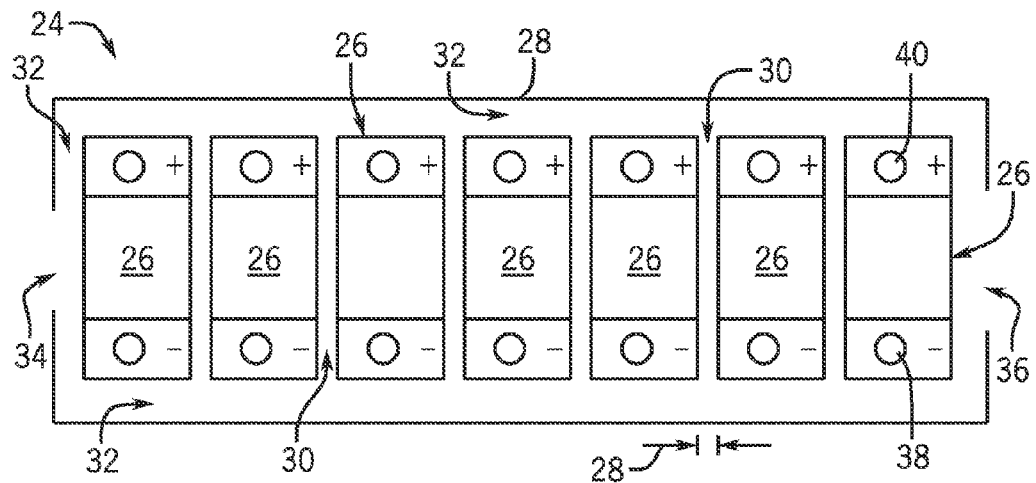
FIG. 3 is a top view of a battery module in accordance with one embodiment of the present disclosure.

FIG. 3 illustrates an exemplary embodiment of a battery module 24 adapted for use in a battery system, such as in the battery system 12. In the illustrated embodiment, the battery module 24 includes a plurality of electrochemical cells or batteries 26, and a housing 28 that partially or completely encloses the plurality of cells 26. However, in other embodiments, the battery module 24 may include a plurality of battery packs, with each battery pack having a plurality of electrochemical cells or batteries, and a housing enclosing the plurality of battery packs. Further, in such embodiments, the battery packs may include a plurality of electrochemical cells or batteries provided therein.

It should be noted that the quantity and arrangement of the electrochemical cells in the battery module 24 may vary based on a variety of implementation-specific considerations. For instance, such features of the battery module 24 may be tailored to meet specific customer requirements (e.g., deliverable power, space constraints, rate capability, etc.). In the illustrated embodiment, the battery module 24, includes a single layer of seven electrochemical cells 26 arranged in a single row with adjacent cells 26 offset by a distance of separation 28, thereby forming a channel (or space or passage) 30 between the adjacent cells 26. However, according to other embodiments, the battery module 24 (or battery pack) may include a plurality of layers of electrochemical cells with each layer of cells arranged in a single row or multiple rows of cells, or may be configured in any other suitable arrangement. Further, it should be noted that the electrochemical cells may be connected in any suitable manner. For example, the cells may be connected in parallel (as shown in FIG. 3), in series, or in alternating parallel and series arrangements (e.g., groups of cells connected in parallel and subsequently connected in series with additional cells).

The channel 30 may be capable of influencing or controlling the thermal properties (e.g., the temperature) of the battery module 24, such as by allowing heated or cooled fluid to pass through the channel 30 and across the surface of the cells 26, thereby influencing the temperature of the cells 26. In some embodiments, the battery module 24 may include a thermal management device (e.g., fan) configured to drive the flow of the fluid (e.g., air) through the battery module or system, thereby regulating or influencing the temperature of the cells 26 therein. The housing 28 may be offset by a distance from the cells 26, thereby forming a second passage 32 between the inside surface of the housing 28 and the cells 26. The heated or cooled fluid may pass through the second passage 32 to regulate or influence the temperatures of the cells 26 of the battery module 24.

In some embodiments, the housing 28 of the battery module 24 may include a plurality of walls forming a substantially hollow polyhedron shape that partially or completely encloses the cells 26 within. However, it should be noted that the shape of the housing 28 may be tailored to accommodate the shape of the battery module or system 24. The housing 28 is further capable of providing protection to the cells 26 within and structural support to the battery module 24.

According to the illustrated embodiment, the housing 28 of the battery module 24 also includes an inlet (or first opening) 34 and an outlet (or exit or second opening) 36. The inlet 34 may be capable of enabling a thermal regulating fluid (e.g., cooled air) to enter the battery module 24 so that the fluid may regulate or influence the temperature of the cells 26 of the battery module 24 (e.g., through convection). The outlet 36 may be capable of enabling the fluid used to regulate or influence the temperature of the cells 26 to exit the battery module 24. The outlet 36 may be fluidly connected to the inlet of an adjacent battery module to thereby transfer the thermal regulating fluid to the adjacent battery module, or may be configured to transfer the thermal regulating fluid outside the battery system (e.g., to a heat exchanger) or outside the vehicle (e.g., to the atmosphere).

Figure 4:
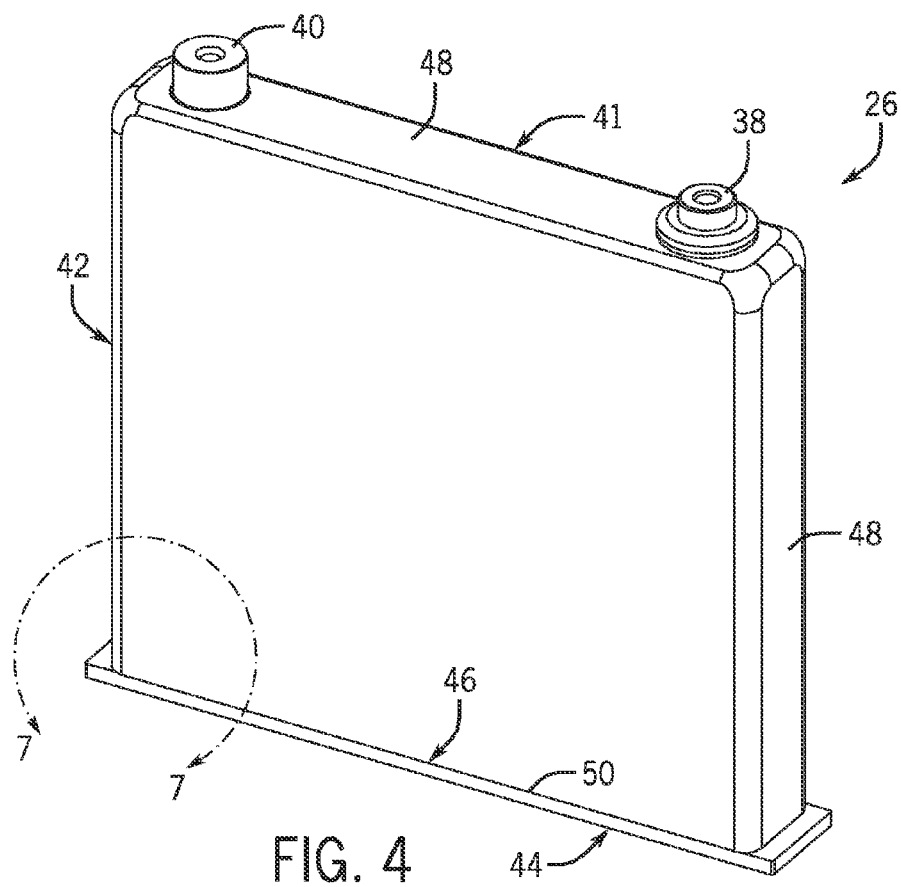
FIG. 4 is a perspective view of an embodiment of a electrochemical cell having positive and negative terminals disposed in a blind side of a drawn can and a base capable of receiving heat from the drawn can.
Figure 5:
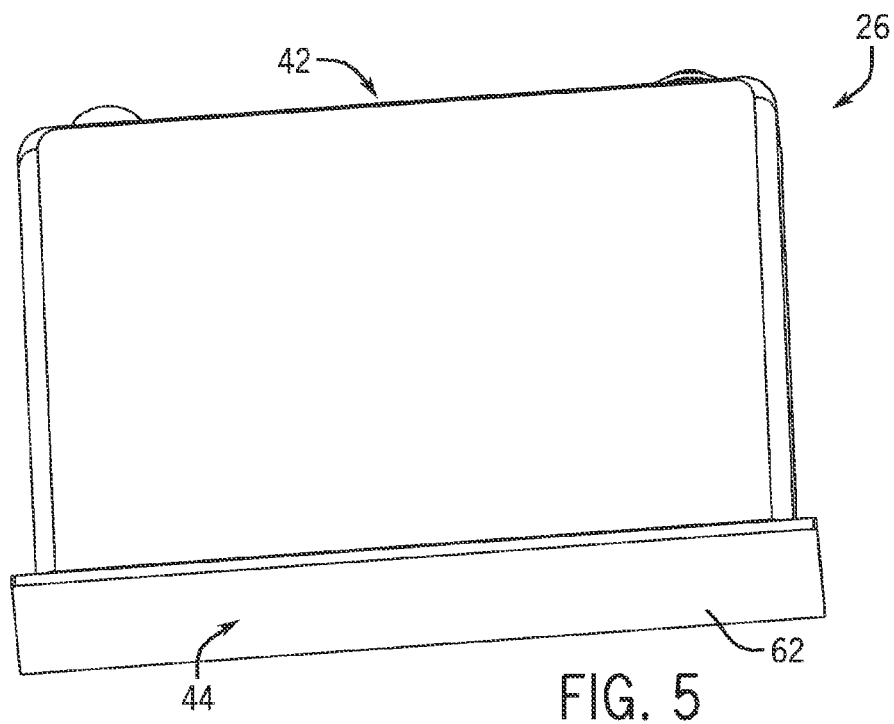
FIG. 5 is a bottom perspective view of the electrochemical cell of FIG. 4.
Figure 6:
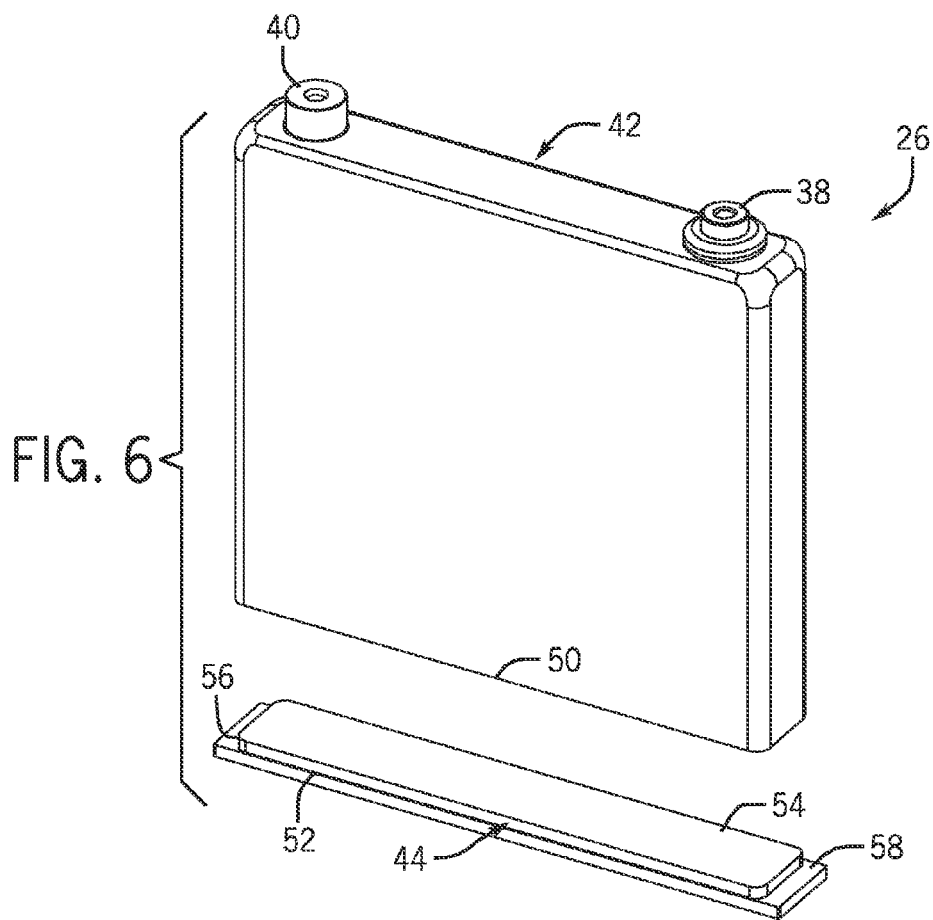
FIG. 6 is a perspective view of the electrochemical cell of FIG. 4 with a base exploded from the cell for clarity.

FIGS. 4-6 illustrate perspective and exploded views of an embodiment of the electrochemical cell 26 that is a prismatic lithium-ion cell configured to store an electrical charge. However, it should be noted that according to other presently contemplated embodiments, the electrochemical cell 26 may take on a variety of other implementation-specific configurations not illustrated herein. For example, in some embodiments, the cells may be cylindrically shaped lithium-ion cells configured to store an electrical charge, or may instead be nickel-metal-hydride cells, lithium-polymer cells, or any other type of electrochemical cells presently known or hereafter developed. Indeed, the electrochemical cells may have any physical configuration (e.g., cylindrical, oval, polygonal, etc.) and may also have varying capacity, size, and design from those electrochemical cells shown herein. It should be noted that the battery module 24 may include any number of electrochemical cells arranged or aligned in any suitable manner, which may be tailored to accommodate various customer or other implementation-specific requirements (e.g., deliverable power, space constraints, rate capability, etc.).

In the illustrated embodiment, each electrochemical cell 26 includes at least one negative electrode and at least one positive electrode (neither are shown, as they are contained internal to the cell). However, according to other embodiments, each electrochemical cell 26 may include a plurality of negative electrodes and positive electrodes, which may be stacked in alternating fashion with separators provided between to provide isolation between adjacent positive and negative electrodes, or configured in any other suitable manner. The negative electrodes and the positive electrodes may be stacked, wound, or configured to have any suitable shape.

In the illustrated embodiment, each electrochemical cell 26 includes at least one negative terminal 38 that is electrically connected to at least one negative electrode and at least one positive terminal 40 that is electrically connected to at least one positive electrode, and the terminals 38 and 40 are disposed in a blind side 41 of a casing (or can) 42. However, in other embodiments, each electrochemical cell 26 may include a plurality of negative and positive terminals, which may be configured in any suitable manner. The negative terminal 38 and the positive terminal 40 may be cylindrically shaped, as shown in FIGS. 4 and 6, or may have any other suitable shape, depending on implementation-specific considerations. The negative terminal 38 may be similarly configured as the positive terminal 40, or may be uniquely configured relative to the positive terminal 40 to ensure the proper connection (i.e., prevent the positive connection from being connected to the negative electrode and vice versa). The negative terminal 38 may be insulated from the casing of the cell by having an insulator provided between the negative terminal 38 and the casing.

According to an embodiment, the electrochemical cell 30 includes the casing (or can) 42 and a base 44 provided below the casing 42, together enclosing the internal contents (e.g., electrodes, separators, etc.) of the cell 26. The casing 42 may be connected to the base 44 along a seam 46, which may be configured to hermetically seal the cell 26, thereby preventing effluent (e.g., gas and/or liquid) from inadvertently escaping the cell 26, as well as preventing water, air or any other fluid from entering the cell. According to one embodiment, the casing 42 may be made from aluminum, steel or other suitable electrically conductive material and may be drawn to form a prismatic shape having a plurality of walls 48 forming an opening on the bottom having an edge 50 that is configured to abut the base 44 and form the seam 46. The conductive casing 42 may also be formed through any other suitable processing method (e.g., machined, stamped, blanked, fine blanked, etc.). According to another embodiment, the casing 42 is made from an electrically insulating material (e.g., polymeric material) that is thermally conductive, and formed by a suitable processing method (e.g., injection molding). Further, the base 44 may be formed through any suitable processing method. For example, in one embodiment, the base 44 may be formed via a fine blanking process.

The opening in the bottom of the casing 42 may be configured to receive a portion of the base 44. The edge 50 formed along the bottom of the casing 42 may be trimmed to have a substantially flat profile for improved contact with the base 44, which may improve the seal along seam 46, as well as improve heat transfer (e.g., by conduction) between the casing 42 and the base 44. The casing 42 may also include openings in one or more than one wall to allow the terminals to pass therethrough. According to an embodiment, the casing 42 includes two openings in the wall 48 corresponding to the top surface of the cell 26, whereby at least a portion of the negative terminal 38 passes through the first opening and at least a portion of the positive terminal 40 passes through the second opening.

In one embodiment, the base 44 may be made from steel, aluminum, an aluminum alloy, or any other suitable electrically conductive material and may be formed through any suitable processing method (e.g., machined, stamped, blanked, fine blanked, etc.) that controls the flatness of the base 44. The base 44 may have a high stiffness (e.g., be relatively rigid) to allow the base 44 to maintain its relative flatness (e.g., when clamped) in order to, among other things, improve the sealing ability as well as the heat transfer (e.g., through conduction) ability of the cell 26. According to another embodiment, the base 44 is made from an electrically insulating material (e.g., polymeric material) and formed by a suitable processing method (e.g., injection molding, machined).

As shown in the exploded view of FIG. 6, the base 44 includes a first portion 52 and a second portion 54 provided above the first portion 52. The first portion 52 may be configured as a substantially rectangular plate having a substantially flat contact surface 56 that is configured to contact the edge 50 of the casing 42 to form the seam 46. According to an embodiment, the base 44 has a width that is substantially equal to the width of the casing 42 and a length that is longer than the length of the casing 42. According to other embodiments, however, the size of the base relative to the casing, as well as the shape of the base, may vary. The second portion 54 may extend from a contact surface 58 of the first portion 52, thereby forming a step configured to engage the opening formed in the bottom of the casing 42 by having a shape substantially similar to the shape of the bottom opening of the casing 42.

According to an embodiment, the profile of the contact surface 58 of the base 44 is configured to be substantially flat, such as by machining The flat contact surface 58 improves the joint formed along the seam 46 between the edge 50 of the casing 42 and the base 44 by having a larger surface area in contact between the casing and the base. The improved joint allows for the casing 42 to be coupled to the base 44 in a more efficient manner, as compared to traditional designs.

Figure 7:
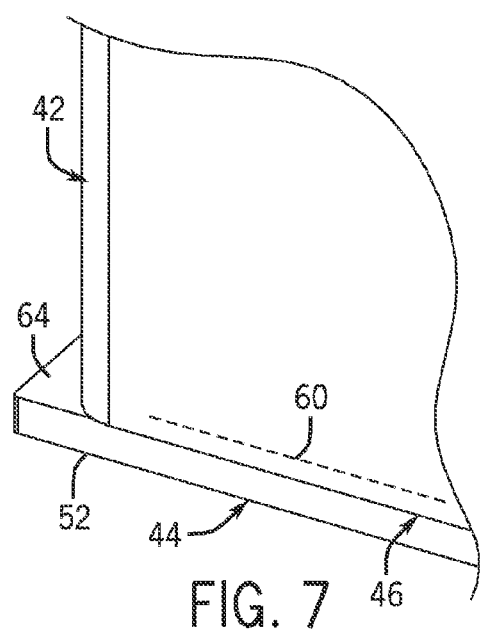
FIG. 7 is a detail view of a seam of the electrochemical cell of FIG. 4.

As illustrated in the section shown in FIG. 7, the casing 42 is coupled to the base 44 along a weld 60 that is substantially parallel to and offset a distance from the seam 46, whereby weld 60 (e.g., such as shown in FIG. 7) is a lap-weld connecting the top layer comprising the wall 48 of the casing 42 to the bottom layer comprising the second portion 54 of the base 44. The distance the weld 60 is offset from the seam 46 is configured to be less than the height that the second portion 54 extends upward from the first portion 52 of the base 44 to ensure proper coupling of parent materials in the joint of the lap-weld 60 between the base 44 and the casing 42.

According to another embodiment, the weld 60 may be provided along the seam 46, such that the weld 60 is a butt-weld between the casing 42 and the base 44. The weld 60 may be configured as a continuous weld along the profile of the casing 42 (and/or the base 44), may be configured as discontinuous linear welds, may be configured as a plurality of individual circular (or semi-circular) welds each weld offset from the adjacent weld, or may be configured using any other suitable weld profile. In some embodiments, the welds may be formed by laser welding. However, any type of welding, such as gas-metal arc welding (e.g., MIG) may be used in other embodiments.

The methods of coupling the base 44 to the casing 42, described herein, reduce the relative amount of weld distortion that the base 44 undergoes as a result, thereby helping to maintain the flatness of the base 44, even after coupling to the casing 42. The less weld distortion the base 44 undergoes during processing, the more efficient the base 44 transfers heat through conduction, as discussed in more detail below.

The transfer of heat from inside the cell 26 through the base 44 by conduction is improved by having and maintaining the improved flatness of the base 44. By having and maintaining a flatter bottom surface 62 of the first portion 52, the base 44 has a greater surface area of contact between it and the mating component (e.g., the housing of the battery module, or another vehicle component), thereby improving the conduction of heat through the base 44 and into the mating vehicle component. By having and maintaining a flatter contact surface 56 and top surface of the second portion 54, the base 44 has a greater surface area of contact with the casing 42 and the internal components of the cell 26, respectively, thereby improving the conduction of heat through the cell 26 into the base 44 and from the casing 42 into the base 44. The flatness of the base 44 may be tightly controlled by the manufacturing method employed to create the base 44, such as machining, and by limiting the distortion, such as during welding, by having an improved method, the flatness of the base may be maintained through assembly. The flatness of the base 44 may also be tightly controlled by having an increased stiffness or rigidity.

As shown in FIG. 7, the first portion 52 of the base 44 may be configured to extend beyond the side wall 48 of the housing in the length direction, thereby forming a lip portion 64. The lip portion 64 may be used to fix the electrochemical cell 26 to the battery module or system or to any vehicle component. For example, the lip portion 64 of the base 44 may be clamped to another vehicle component (e.g., floor-pan) to fix the cell 26 to the other component. As another example, the lip portion 64 may include an opening configured to receive a fastener to couple the cell 26 to another vehicle component (e.g., floor-pan).

Figure 8:
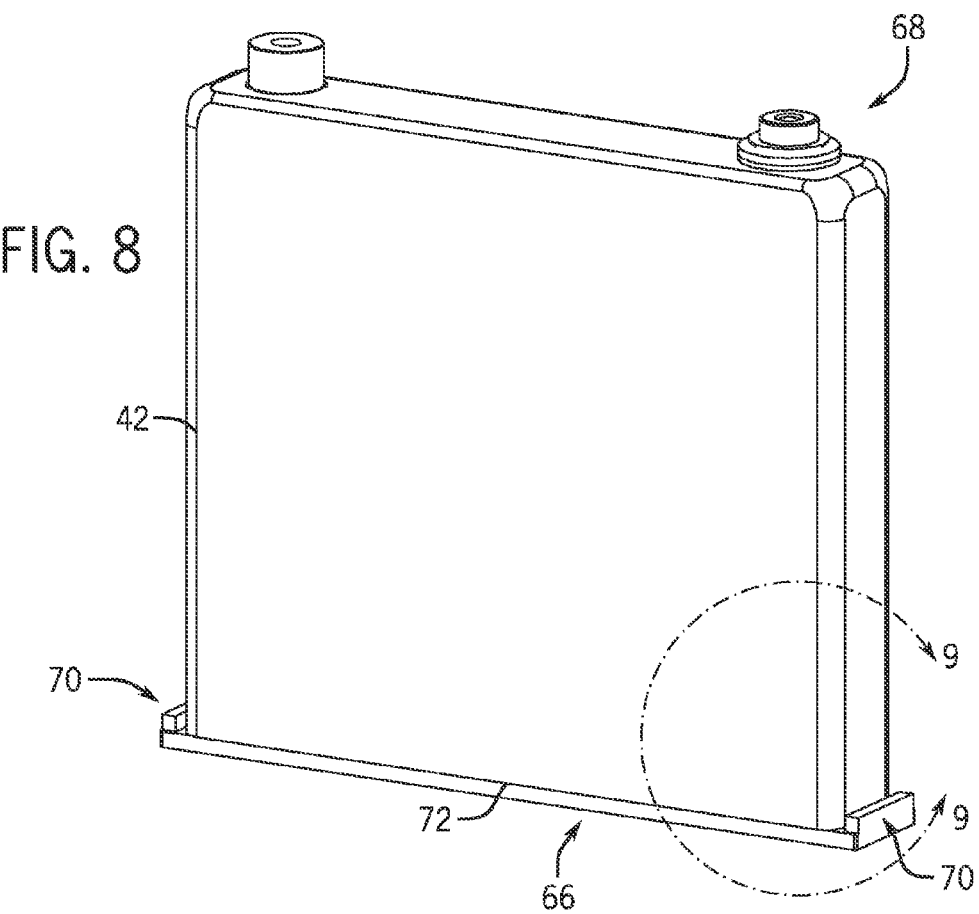
FIG. 8 is a perspective view of another embodiment of an electrochemical cell having positive and negative terminals disposed in a blind side of a drawn can and a base including a locking member for coupling of the base to a vehicle component.
Figure 9:
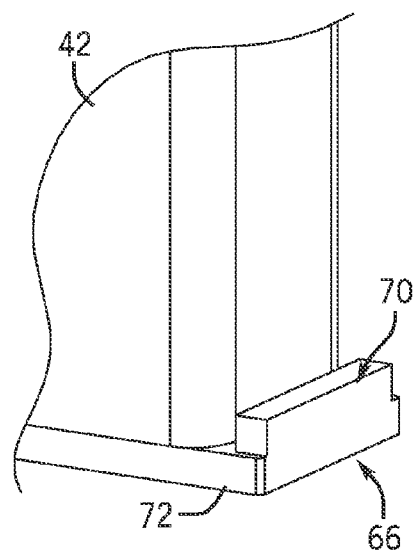
FIG. 9 is a detail view of the locking member of the electrochemical cell of FIG. 8.

As shown in FIGS. 8 and 9, a base 66 of an electrochemical cell 68 may also include a locking member 70 to facilitate coupling of the base 66 (and hence the cell 68) to the battery module or to another vehicle component (e.g., floor-pan). In one embodiment, the locking member 70 may be configured as a protruding portion having a substantially rectangular cross-section that extends from the top surface of a first portion 72 of the base 66. The locking member 70 provides a contact point (or area) near the clamp point (or area) to minimize the deflection caused by clamping the cell, such as the locking member or base, to the battery module. By minimizing the deflection of the base upon clamping, the increased heat transfer of the cell is maintained by having a larger surface area of contact, such as between the casing and the base and/or the housing and the base, to transfer heat.

In other words, the heat sink created by the large surface area of contact between the base and the casing and the base and the housing is maintained after the cell is connected (e.g., clamped) to the mating component of the battery module or the vehicle. In one embodiment, the cell may be configured to include a locking member on both ends of the base, whereby each locking member is retained by a portion of the battery module. However, in another embodiment, the cell may include a locking member on one end of the base that is retained by the battery module, and may have an opening on the other end of the base that receives a fastener. The locking member may act as a wedge relative to another portion of the battery module to fix the wedged end of the cell to the battery module without the need for a fastener or other coupling member, thereby possibly reducing cost.

By being able to fix or couple the cells 26, 68 to the battery module or other vehicle components using the lip portion 64 and/or the locking member 70, the cell remains hermetically sealed, even if an opening is provided in the lip portion 64 to receive a fastener for coupling the cell. The lip portion 64 and/or the locking member 70 also allows for the use of a relative large clamp load to retain the base 44 and, hence, the cell, to the battery module or to the vehicle component.

It should be noted that the electrochemical cells may also include a heat conductor (or foil member) to improve heat transfer of the cell. The heat conductor may be provided internal to the cells to conductively transfer heat away from the electrodes of the cells to the casing or the base of the cells. The heat conductor may be a flat plate configured to couple to an electrode of the cell provided within the casing in order to transfer the heat generated by the electrode of the cell through the heat conductor to the casing (e.g., the wall). The heat conductor may be a foil made from a conductive (e.g., electrically conductive, thermally conductive) material, such as copper, aluminum, etc., or alloys thereof. The heat conductor may be coupled to the electrode of the cell using any suitable process, such as welding (e.g., laser, MIG, TIG, ultrasonic) or soldering.

FIGS. 10 and 11 illustrate an embodiment of an electrochemical cell 74 that includes an electrode group 76 configured to store an electrical charge provided within a casing (or can) 78. The electrode group 76 may include a positive electrode having a positive active material, a negative electrode having a negative active material, and a separator made from an electrically insulating material (e.g., 2325 separator manufactured by Celgard), wherein the separator is provided between the positive electrode and negative electrode. For example, one layer of the electrode group 76 may comprise a layer of the positive electrode, a first layer of the separator, a layer of the negative electrode, and a second layer of the separator. The electrode group 76 may be wound or stacked, wherein a plurality of layers of the electrode group 76 are positioned adjacent to other layers to form the electrode group 76 for use in the electrochemical cell 74.

The electrochemical cell 74 may also include a negative current collector 80 for electrically connecting the negative electrode to a negative terminal 82, and a positive current collector 84 for electrically connecting the positive electrode to a positive terminal 88, which may be provided on the end of the cell opposite the end having the negative terminal 82. The negative and positive current collectors 80 and 84 may be provided in any suitable shape and may be made from a conductive (e.g., electrically conductive, thermally conductive) material, such as aluminum, copper, or an alloy thereof. For example, in one embodiment, the positive current collector 84 is made from aluminum and is configured to form a C-shape, wherein the legs of the C extend downwardly around the electrode group 76 and are in contact with the positive electrode of the electrode group to thereby conduct electric current therethrough. For further example, in one embodiment, the negative current collector 80 is made from copper and is configured to form a C-shape, wherein the legs of the C extend downwardly around the electrode group 76 and are in contact with the negative electrode of the electrode group to thereby conduct electric current therethrough.

According to one embodiment, the electrochemical cell 74 includes a first (or positive) heat conductor or collector 90 and a second (or negative) heat conductor or collector 92. The positive heat conductor 90 (or heat collector) may be configured to transfer, such as through conduction, the heat from the positive electrode and the positive current collector to the casing 78, such as to one or more walls 94. The positive heat conductor 90 may be made from a thermally conductive material and may be provided between the wound electrode and the casing, such as adjacent to the front wall of the casing.

Figure 12:
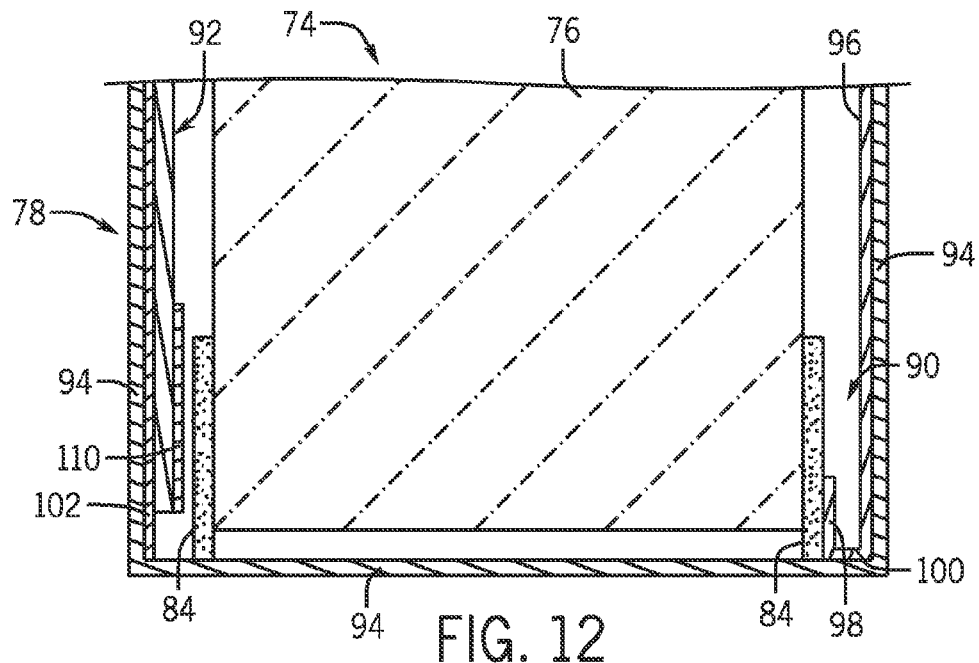
FIG. 12 is a cross sectional view of the cell of FIG. 11 taken along line 12-12 and illustrating a heat conductor configured to transfer heat from the positive current collector in accordance with a presently disclosed embodiment.

According to the embodiment shown in FIG. 12, the positive heat conductor 90 (or heat collector) is made from aluminum foil about 0.5 mm thick and has a J-shaped cross-section, wherein a long leg 96 of the J-shape abuts the inside surface of a wall 94 of the casing 78 and a short leg 98 of the J-shape abuts the positive current collector 84. A base 100 (of the J-shape) of the positive heat conductor 90 may abut a wall 94 of the casing 78 or may be adjacent to a wall 94 of the casing 78 with a gap provided therebetween. Therefore, the heat generated by the electrode (e.g., the positive electrode) is transferred to the casing 78 through the positive current collector 84 and positive heat conductor 90.

The positive heat conductor 90 may be configured to extend longitudinally the full width of the front wall, with a layer of electrically insulating material or isolator (such as isolator 102) being provided between the positive heat conductor 90 and the negative current collector 80. Alternatively, the positive heat conductor 90 may extend longitudinally a length that is less than the full width of the front wall and short of (i.e., not in contact with) the negative current collector 80, wherein no layer of electrically insulating material (or isolator) is needed between the positive heat conductor 90 and the negative current collector 80. Such contact may be undesirable because it may cause an electric short in certain instances.

The second (or negative) heat conductor 92 may be configured to transfer, such as through conduction, the heat from the negative electrode and the negative current collector 80 to the casing 78, such as to one or more walls 94. The negative heat conductor may be made from a thermally conductive material and may be provided between the wound electrode and the casing. According to the embodiment shown in FIG. 13, the negative heat conductor 92 is made from copper foil about 0.5 mm thick and has a J-shaped cross-section, wherein a short leg 104 of the J-shape abuts the negative current collector 80 and a long leg 106 of the J-shape is adjacent to a wall 94 of the casing 78.

As before, the cell 74 may include a layer of electrically insulating material or an isolator 102 provided between the casing 78 and the negative heat collector 92, wherein the isolator 102 prevents electrical conduction and allows thermal conduction. In other words, the insulating layer or the isolator may be thermally conductive and electrically insulating to transfer the heat but not the electric current. Preferably the isolator 102 has a relative high thermal conductivity, while preventing electrical conduction. A base 108 of the J-shape of the negative heat conductor 92 may be adjacent to a wall 94 of the casing 78 with a gap provided between to prevent contact that could induce an electrical short.

As shown in FIG. 12, the negative heat conductor 92 may be configured to extend a length that positions a portion of the negative heat conductor 92 adjacent to the positive current collector 84. Accordingly, a second layer of electrically insulating material or a second isolator 110 may be provided between the negative heat conductor 92 and the positive current collector 84 to prevent an electrical short therebetween. Alternatively, the negative heat conductor 92 may extend a length wherein the end of the negative heat conductor 92 is short of the positive current collector 84 (i.e., wherein no portion of the negative heat conductor 92 is adjacent to the positive current collector 84). Accordingly, no layer of electrically insulating material or isolator is needed between the negative heat conductor 92 and the positive current collector 84 because contact is not possible between the negative heat conductor 92 and positive current collector 84.

It should be noted that the heat conductors or collectors may be made from any suitable material that has a relatively high thermal conductivity, and may also have any suitable implementation-specific thickness, shape, or configuration. Indeed, the embodiments of the heat conductors or collectors shown and described in the present application are not meant as limitations.

Figure 13:
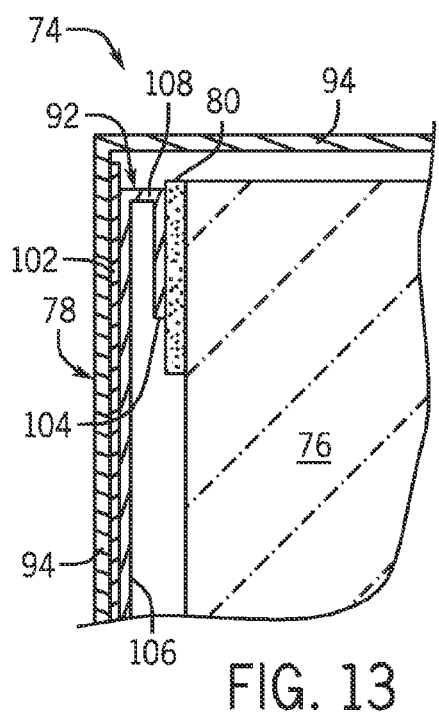
FIG. 13 is a cross sectional view of the cell of FIG. 11 taken along line 13-13 and illustrating a heat conductor configured to transfer heat from the negative current collector in accordance with a presently disclosed embodiment.
Figure 14:
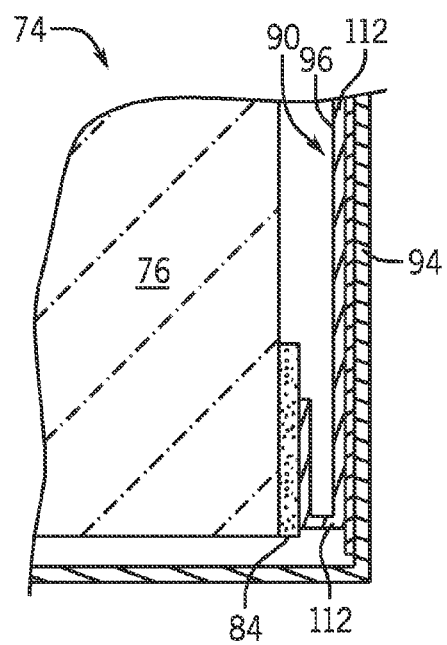
FIG. 14 is a cross sectional view illustrating a layer of insulating material provided between the casing of the cell and the heat conductor in accordance with a presently disclosed embodiment.

FIGS. 12-14 illustrate cross-sections for various configurations of electrochemical cells having heat conductors or collectors for transferring heat from the positive and negative electrodes of the cells to the casing of the cells. FIG. 12 illustrates one end of the electrochemical cell 74 having a charged casing 78 with the positive heat collector 90 abutting the positive current collector 84 on the inside and the casing 78 on the outside. The negative heat collector 92 is electrically insulated from the casing 78 by the isolator 102 and is electrically insulated from the positive current collector 84 by the isolator 110 to prevent an electric short.

As discussed in more detail above, FIG. 13 illustrates the portion of the end of the electrochemical cell 74 where the negative heat conductor 92 is in contact with the negative current collector 80, in order for the negative heat conductor 92 to act as a heat sink to collect and distribute the heat away from the electrode 76 of the cell 74. Additionally, FIG. 14 illustrates an alternative embodiment to the charged can shown in FIG. 12, where the casing 78 of the cell 74 is neutral (or non-charged). The cell 74 may include a layer of electrically insulating material or an isolator 112 provided between the casing 78 and the positive heat conductor 90, wherein the isolator 112 prevents electrical conduction but allows thermal conduction.

Figure 16:
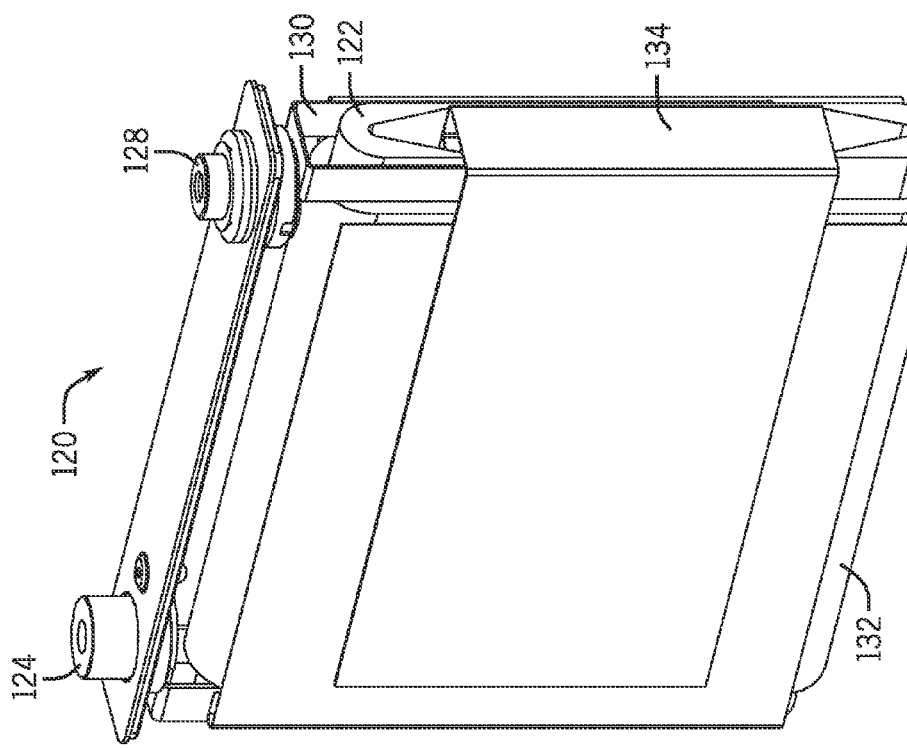
FIG. 16 is a rear perspective view of the electrochemical cell of FIG. 15.
Figure 15:
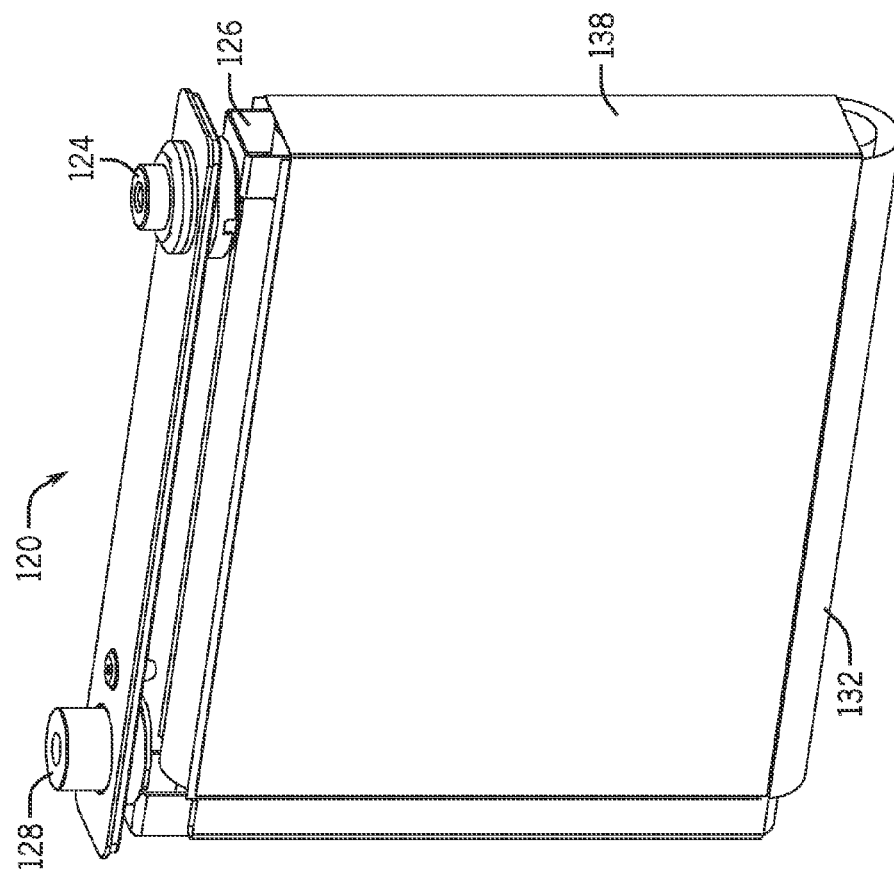
FIG. 15 is a front perspective view of an embodiment of an electrochemical cell having a heat conductor provided within the cell.

FIGS. 15 and 16 illustrate another embodiment of an electrochemical cell 120 that includes an electrode group 122 configured to store an electrical charge provided within a casing (which has been removed for clarity). The electrode group 122 may include a positive electrode having a positive active material, a negative electrode having a negative active material, and a separator made from an electrically insulating material, wherein the separator is provided between the positive electrode and negative electrode and the resulting electrode may be wound or stacked. The electrode group 122 may be electrically coupled to a negative terminal 124 through a negative current collector 126 and to a positive terminal 128 through a positive current collector 130.

The electrochemical cell 120 also includes a layer of electrically insulating material or an isolator 132, a positive heat conductor or collector 134 (or first heat conductor), and a negative heat conductor or collector 136 (or second heat conductor). The heat conductors transfer the heat generated within the electrode of the cell to the casing to more efficiently regulate (e.g., cool) the internal temperature of the cell 120. The isolator 132 may cover the outside of the front and rear surfaces of the electrode group 122 to electrically insulate those surfaces of the electrode group 122.

In one embodiment, a first portion of the positive heat conductor 134 may be provided between the rear surface of the isolator 132 (that covers the rear surface of the electrode group 122) and the casing of the cell 120, and the positive heat conductor 134 may abut the inside surface of a wall (e.g., rear wall) of the casing, resulting in a charged casing. A second portion of the positive heat conductor 134 may contact a portion of the positive electrode of the electrode group 122, such as along the side of the cell 120 having the positive terminal 128. The negative heat conductor 136 may be similarly configured, but may be provided adjacent to the front surface of the isolator 132 and may contact a portion of the negative electrode of the electrode group 122, such as along the side of the cell 120 having the negative terminal 124.

In one embodiment, the cell 120 may also include a second layer of electrically insulating material or a second isolator 138, wherein the second isolator 138 may be provided between the casing of the cell 120 and the negative heat conductor 136 to thereby electrically insulate (i.e., prevent electrical conduction to) the casing from the negative heat conductor 136 to avoid an electric short, yet to allow heat to transfer (e.g., thermal conductivity) from the negative heat conductor 136 to the casing through the second isolator 138. The second isolator 138 may extend along the side of the cell 120 having the negative terminal 124 and may extend along the inside of the front surface of the casing.

Figure 18:
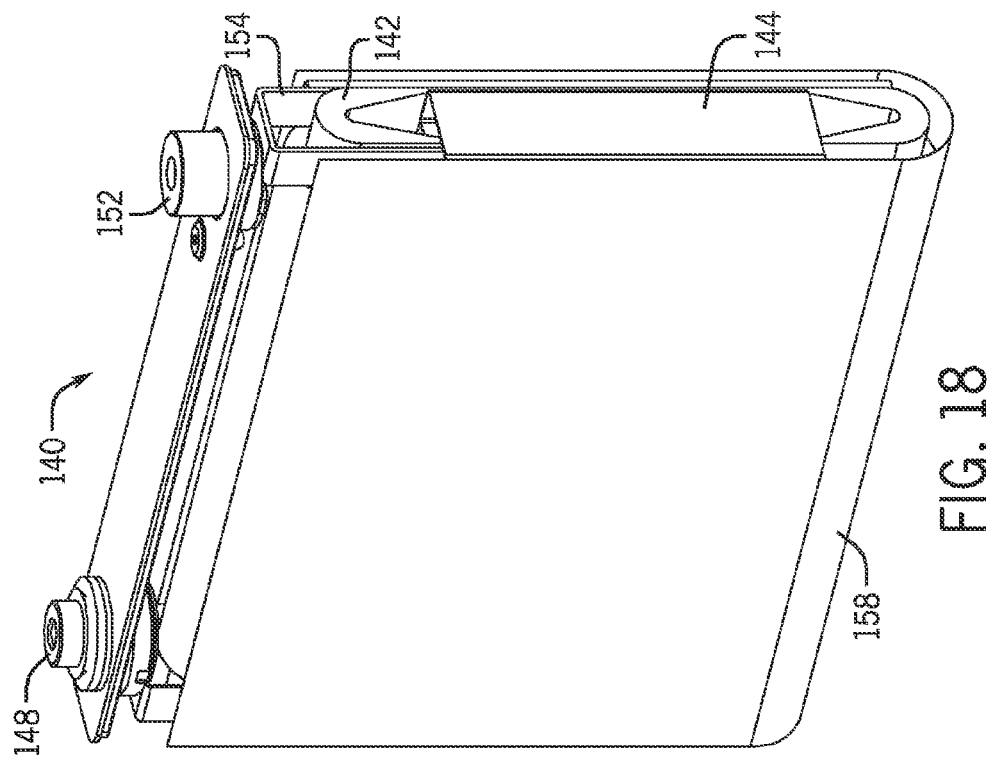
FIG. 18 is a rear perspective view of the electrochemical cell of FIG. 17.
Figure 17:
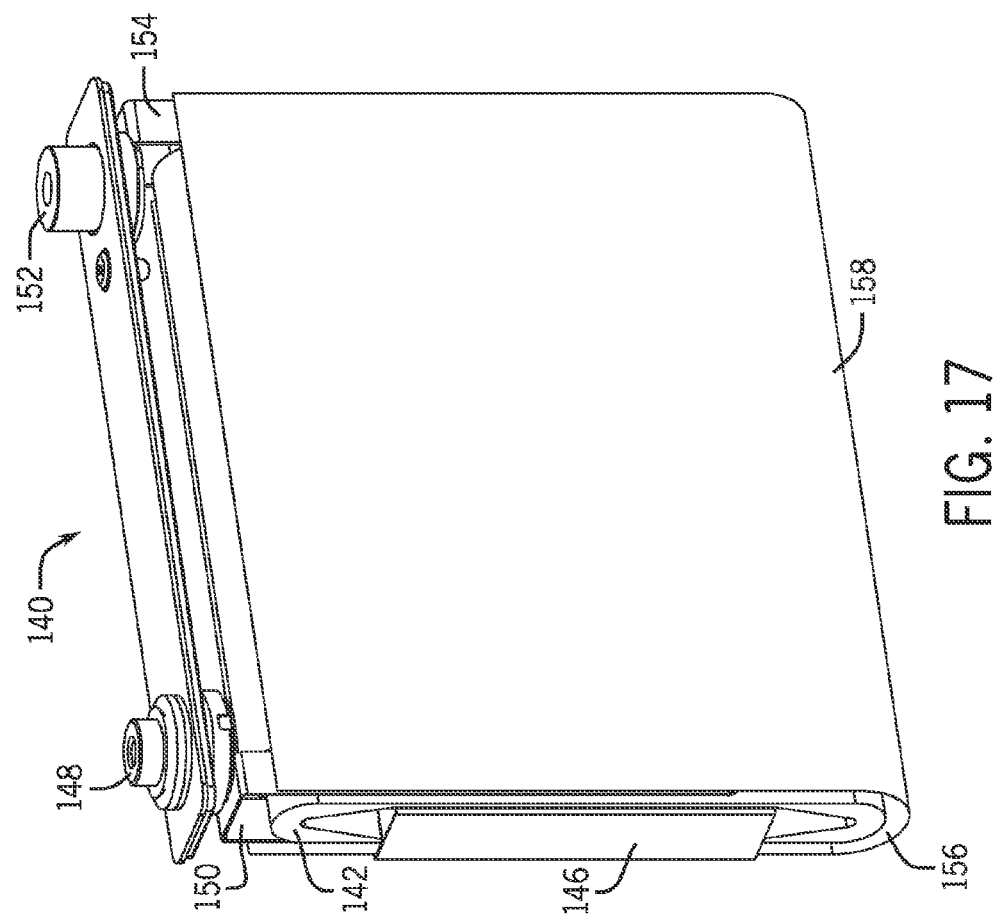
FIG. 17 is a front perspective view of another embodiment of an electrochemical cell having a heat conductor provided within the cell.

FIGS. 17-19 illustrate another embodiment of an electrochemical cell 140 having a casing (or can) 147 and walls 149. The electrochemical cell 140 includes an electrode group 142 configured to store an electrical charge, a positive heat conductor or collector 144 (or first heat conductor), a negative heat conductor or collector 146 (or second heat conductor), and a casing (removed for clarity) to enclose at least a portion of the cell 140. The electrode group 142 may include a positive electrode having a positive active material, a negative electrode having a negative active material, and a separator made from an electrically insulating material. The separator is provided between the positive electrode and negative electrode, and the resulting electrode may be wound or stacked. The electrode group 142 may be electrically coupled to a negative terminal 148, such as through a negative current collector 150, and to a positive terminal 152, such as through a positive current collector 154.

The electrochemical cell 140 may also include a first layer of electrically insulating material or a first isolator 156 and a second layer of electrically insulating material or a second isolator 158. The first isolator 156 may be provided between the electrode group 142 and the heat conductors (e.g., positive heat conductor 144, negative heat conductor 146), such as between the front and rear surfaces of the electrode group 142 and the heat conductors, to electrically insulate the electrode group 142 to prevent an electric short. The second isolator 158 may be provided between the heat conductors (e.g., positive heat conductor 144, negative heat conductor 146) and a casing 147 of the cell 140 to electrically insulate the casing and to prevent an electric short. Thus, the casing 147 of the cell 140 may be neutral or configured without a charge.

The positive heat conductor 144 may be provided between the first isolator 156 and the second isolator 158, such as adjacent to the rear surface of the casing, and the positive heat conductor 144 may contact the positive electrode directly (or alternatively, may contact the positive current collector 154 that contacts the positive electrode) to transfer (or conduct) the heat from the electrode to the casing of the cell 140. The negative heat conductor 146 may be provided between the first isolator 156 and the second isolator 158, such as adjacent to the front surface of the casing, and may contact the negative electrode directly (or alternatively, may contact the negative current collector 150 that contacts the negative electrode) to transfer (or conduct) the heat from the electrode to the casing of the cell 140. Because the isolators (e.g., the first isolator 156, the second isolator 158) are thermally conductive, the heat generated in the electrode group 142 may be transferred to the heat conductor through the current collector, then from the heat conductor to the casing of the cell 140 through the second isolator 158. Alternatively, the heat generated in the electrode group 142 may be transferred directly to the heat conductor, then to the casing 147 of the cell 140 through the second isolator 158.

The electrochemical cells that include the positive and/or negative heat conductors (or collectors) have an improved thermal efficiency by being able to transfer (e.g., conduct) the heat generated within the cell to outside the cell electrodes more efficiently. The cells are able to transfer the heat generated by the electrode group directly from the positive electrode to the casing through the positive heat conductor and from the negative electrode to the casing through the negative heat conductor, with a layer of electrically insulating (not thermally insulating) material provided between the casing and the heat collectors.

For example, the heat generated by the positive electrode may transfer longitudinally along the length of the electrode through the relatively high thermally efficient positive active material of the positive electrode to the positive heat conductor, such as through the positive current collector. The positive heat conductor may act like a heat sink to then transfer the heat directly to the casing or through a layer of electrically insulating material to the casing, depending on the configuration. The positive heat conductor having a large surface area of contact with the casing distributes the heat efficiently to the casing, which may then be transferred external to the cell, such as by convection using forced air or liquid.

For further example, the heat generated by the negative electrode may transfer longitudinally along the length of the electrode through the relatively high thermally efficient negative active material of the negative electrode to the negative heat conductor, such as through the negative current collector. The negative heat conductor may act like a heat sink to then transfer the heat directly to the casing or through a layer of electrically insulating material to the casing, depending on the configuration. The negative heat conductor having a large surface area of contact with the casing distributes the heat efficiently to the casing, which may then be transferred external to the cell, such as by convection using forced air or liquid.

An electrochemical cell that transfers the heat generated by the wound electrode group transversely through the electrode (i.e., a cell that transfers the heat from inside of the electrode group to outside of the electrode group through the plurality of adjacent wound layers of electrode), may be less efficient than the electrochemical cells described herein, which transfer heat longitudinally. The cells that transfer heat transversely through the electrode group must transfer the heat through each adjacent layer of wound (or stacked) electrode, wherein each layer generally includes two layers of separator material that typically has a relative low thermal conductivity. Since, it is not uncommon for a wound electrode to include between thirty and forty layers of electrode material, for the heat to transfer from the inner most layer of a cell having thirty layers of electrode wound together, the heat must pass through sixty layers of separator in addition to the thirty layers of the electrode material, just for the heat to reach outside of the electrode group. Accordingly, transferring the heat generated by the electrode group transversely through the electrode group may be inefficient.

The electrochemical cells shown and described herein for use in battery modules transfer the heat longitudinally through the electrode group (i.e., a cell that transfers the heat from inside the electrode group to outside of the electrode group through each individual layer along the length of that layer to the current collector or directly to the heat conductor, as opposed to through all the adjacent layers) is more efficient, because, for example, the heat does not have to pass through each layer of separator in the electrode group. Also, the cells shown and described herein that transfer heat longitudinally through the electrode group do not have to pass the heat through each layer of positive electrode and each layer of negative electrode that are provided between the casing and the respective layer where the heat is generated, in order for the heat to reach the casing. Instead, the heat can efficiently move longitudinally (as opposed to transversely) within the electrode group of the cell to the heat conductor and then from the heat conductor to the casing.

Also, as shown in FIG. 11, the casing 78 of the electrochemical cell 74 may be prismatic in shape having four walls 94 configured transverse to a bottom portion 160, and an edge or transition portion 162 is provided between the bottom portion 160 and the walls 94. The casing 78 may be made from aluminum and drawn to shape, or may be made from any suitable material, which may be conducting or insulating, formed by any suitable method, depending on implementation-specific considerations. According to one embodiment, the bottom portion 160 may be convex in shape, such that the curve moves away from the cell. The convex bottom portion 160 of the casing 78 may improve the thermal efficiency of the cell 74 by providing additional surface area of contact between the casing 78 and the abutting member (e.g., base).

The casing 78 being made from a preferably thin gauge (e.g., about 0.8 mm, or thinner) of a resilient material, such as aluminum, which allows the convex bottom portion to elastically deform when brought into contact with another member, such as the base of the cell, to form a relatively flat surface after contact and deformation. When deformed to the flat configuration from the convex configuration, the bottom portion acts like a spring, having stored energy from the elastic deformation, and the stored energy imparts a force to help maintain contact between the bottom portion 160 of the cell and the abutting member. This spring force in the bottom portion 160 of the casing 78 induces a greater surface of contact between the bottom portion 160 and the abutting member to increase the efficiency of heat transfer, such as by conduction, between the contacting surfaces.

Cells being formed with a flat bottom may have the tendency to deform inwardly (i.e., to form a concave bottom portion) when brought into contact with another member because the edges are stronger than the center portion. Thus, the bottom portion, if formed flat prior to coupling to another member, acts like a simply supported beam, and may deform to curve away from the abutting portion of the member, thereby losing surface area of contact, which results in less efficient heat transfer from the bottom of the casing of the cell to the abutting member.

FIGS. 20 and 21 illustrate embodiments of heat conductors or heat collectors that may contact the electrode group of the cell to conduct (or transfer) the heat generated by the electrode away from the electrode. The heat conductors 136, 170 may include two layers of material, and along a long end that may contact the electrode (or may be separated from the electrode by a gap), the two layers may be adjacent or abutting each other and along an end, the two layers may be configured into a rectangular shape to fit within a cavity of the electrode group, such as shown in FIG. 19. The heat conductor 136 may have relatively sharp corners to increase the surface of contact with the electrode, or the heat conductor 170 may have contoured corners (e.g., fillet, radius) to improve manufacture of the heat conductor. The size (e.g., length, width, depth) and shape (e.g., square, rectangle, cylindrical, etc.) of the heat conductor may vary and may be tailored to form a shape substantially similar to the electrode group or at least a portion thereof.

The battery modules disclosed herein, include electrochemical cells configured to efficiently transfer heat while maintaining a hermetically sealed cell to avoid the inadvertent escape of effluent from the cell. The cell may be configured to include a base having a controlled flatness to improve the connecting seam with the casing of the cell, as well as to provide an increased surface area of contact with another component of the battery module (or the vehicle) to increase the heat conducted from the cell to the other component. The flatness of the base may be controlled by the production method, such as machining, of the base, as well as by having an improved assembly process of the cell, such as to reduce or eliminate the weld distortion on the base created when coupling the base to the casing.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the provided figures. It should be noted that the orientation of various elements may differ according to other embodiments, and that such variations are intended to be encompassed by the present disclosure.

It is important to note that the construction and arrangement of the electrochemical cells as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

The invention claimed is:

1. A battery cell, comprising:
   a drawn can comprising a closed blind side and an open second side opposite the blind side;
   a positive terminal disposed in the blind side of the can and electrically coupled to at least one positive electrode disposed within the can;
   a negative terminal disposed in the blind side of the can and electrically coupled to at least one negative electrode disposed within the can; and
   a base coupled to the second side of the can to close the second side, wherein a bottom surface of the base is configured to maintain a substantially flat configuration when coupled to a heat sink and the base is formed from steel, aluminum, an aluminum alloy, or a combination thereof.

2. The battery cell of claim 1, wherein the base comprises a first portion having a length that is longer than the length of the can and a second portion above the first portion, and wherein a substantially flat contact surface of the first portion is configured to contact a substantially flat edge disposed on the second side of the can to form a seam between the base and the can.

3. The battery cell of claim 2, wherein the base is laser welded to the can along the seam.

4. The battery cell of claim 2, wherein the base is coupled to the can via a weld that is substantially parallel to and offset a distance from the seam.

5. The battery cell of claim 1, wherein the base is formed from a thermally conductive material configured to conduct heat from the battery cell and the can into the base.

6. The battery cell of claim 1, wherein the base comprises a lip portion extending beyond a side wall of the can in the lengthwise direction, wherein the lip portion is configured to be coupled to a vehicle component to fix the battery cell relative to the vehicle component.

7. The battery cell of claim 1, wherein the base comprises a first portion having a length that is longer than the length of the can and a locking member protruding from a top surface of the first portion, wherein the locking member is configured to be coupled to a vehicle component to fix the battery cell relative to the vehicle component.

8. A battery cell, comprising:
   a drawn can comprising a closed blind side and an open second side opposite the blind side;
   a base coupled to the second side of the can to close the second side, wherein the base comprises a substantially flat bottom surface configured to remain substantially flat when the base is coupled to a heat sink;
   a terminal disposed in the blind side of the can and electrically coupled to at least one electrode disposed within the can;
   a current collector coupled to the electrode and to the terminal to electrically connect the electrode to the terminal;
   a heat conductor thermally coupled to the current collector and configured to dissipate heat away from the electrode and the current collector; and
   an isolation member disposed between the current collector and the can to electrically separate but thermally couple the current collector and the can.

9. The battery cell of claim 8, wherein the electrode comprises an anode and a second terminal is disposed in the blind side of the can and electrically coupled to a second electrode, and further comprising a second current collector coupled to the second electrode and to the second terminal, a second heat conductor thermally coupled to the second current collector, and a second isolation member disposed between the second current collector and the can to electrically separate but thermally couple the second current collector and the can, wherein the second electrode comprises a cathode.

10. The battery cell of claim 8, wherein the base is coupled to a substantially flat edge of the second side of the can via laser welding.

11. The battery cell of claim 8, wherein the base comprises a first portion having a length that is longer than the length of the can and a second portion above the first portion, and wherein the base is a single piece formed via a fine blanking process.

12. The battery cell of claim 8, wherein the drawn can, the base, or both are made of aluminum.

13. The battery cell of claim 8, wherein the base comprises a first portion having a length that is longer than the length of the can and an extension disposed substantially perpendicular to a top surface of the first portion and a second portion above the first portion, and wherein the extension is configured to couple to a complementary extension of an adjacent can to couple the can to the adjacent can.

14. A battery cell, comprising:
a housing, comprising:
a casing having an opening disposed in a bottom portion of the casing opposite a closed blind side of the casing; and
a base sealed in the opening of the casing, wherein a bottom surface of the base is substantially flat, wherein the base comprises a substantially flat contact surface configured to contact a substantially flat edge disposed on the bottom portion of the casing to form a seam between the base and the casing, and wherein the base is coupled to the casing via a weld that is substantially parallel to and offset a distance from the seam; and
a plurality of terminals disposed in the blind side of the casing and electrically coupled to at least one electrode disposed within the casing.

15. The battery cell of claim 14, wherein a portion of the base is configured to extend beyond a side wall of the casing in the lengthwise direction to form a lip portion.

16. The battery cell of claim 15, wherein the lip portion is configured to be coupled to a secondary component to fix the battery cell with respect to the secondary component.

17. The battery cell of claim 15, wherein the lip portion comprises an aperture configured to receive a fastener to couple the battery cell to a secondary component.

18. The battery cell of claim 14, comprising a current collector coupled to a first electrode and to a first terminal of the plurality of terminals to electrically connect the first electrode to the first terminal, a heat conductor thermally coupled to the current collector and configured to dissipate heat away from the first electrode and the current collector, and an isolation member disposed between the current collector and the casing to electrically separate but thermally couple the current collector and the casing.

19. The battery cell of claim 18, wherein the first electrode comprises an anode and a second terminal is disposed in the blind side of the casing and electrically coupled to a second electrode, and further comprising a second current collector coupled to the second electrode and to the second terminal, a second heat conductor thermally coupled to the second current collector, and a second isolation member disposed between the second current collector and the casing to electrically separate but thermally couple the second current collector and the casing, wherein the second electrode comprises a cathode.

* * * * *